United States Patent [19]
Britt et al.

[11] Patent Number: 5,945,991
[45] Date of Patent: Aug. 31, 1999

[54] METHOD AND APPARATUS FOR CENTERING AN IMAGE ON A DISPLAY MONITOR

[75] Inventors: Joe F. Britt, Saratoga; Bruce A. Leak, Palo Alto, both of Calif.

[73] Assignee: WebTV Networks, Inc., Mountain View, Calif.

[21] Appl. No.: 08/845,511

[22] Filed: Apr. 24, 1997

Related U.S. Application Data

[63] Continuation-in-part of application No. 08/660,088, Jun. 3, 1996.

[51] Int. Cl.$^6$ .................................................. G06F 13/00
[52] U.S. Cl. .......................... 345/333; 345/327; 345/357
[58] Field of Search ................................ 345/333, 327, 345/356–357, 326, 336, 328, 34, 330, 339, 332, 334–352; 348/7–12, 565–566; 395/200.33, 200.47–200.49; 455/301–307

[56] References Cited

U.S. PATENT DOCUMENTS

| | | | |
|---|---|---|---|
| 5,325,423 | 6/1994 | Lewis | 379/90 |
| 5,488,411 | 1/1996 | Lewis | 348/8 |
| 5,538,255 | 7/1996 | Barker | 463/41 |
| 5,558,339 | 9/1996 | Perlman | 463/42 |
| 5,564,001 | 10/1996 | Lewis | 395/154 |
| 5,586,257 | 12/1996 | Perlman | 463/42 |
| 5,612,730 | 3/1997 | Lewis | 348/8 |
| 5,657,092 | 8/1997 | Kim | 348/565 |
| 5,680,177 | 10/1997 | Abe | 348/564 |
| 5,689,665 | 11/1997 | Mitsui et al. | 345/342 |
| 5,721,827 | 2/1998 | Logan et al. | 395/200.47 |
| 5,732,216 | 3/1998 | Logan et al. | 395/200.33 |
| 5,745,909 | 4/1998 | Perlman et al. | 707/513 |

OTHER PUBLICATIONS

Simpson, *Windows® 95 uncut*, IDG Books Worldwide Inc, Foster City, Ca. pp. 408–412, 1995.
Brown, *Using Netscape™ 2*, Que Corp., IN., pp. 148–155, 162–163, 480–487,490–491,494, 1995.

*Primary Examiner*—Steven P. Sax
*Attorney, Agent, or Firm*—Workman, Nydegger, Seeley

[57] ABSTRACT

Web browser software implemented in a set-top box as part of a client system communicating over the Internet with one or more servers allows a user to adjust the position of a screen image displayed on a monitor through World-Wide Web pages displayed on the monitor. The web browser software provides a center adjustment screen which contains control buttons allowing the centering of the screen image on the display, and instructions on how to center the screen image using the control buttons. The user centers the active area of the screen image displayed on the display monitor using the control buttons on the center adjustment screen. The offset values corresponding to the user input of the position controls are stored in memory so that the center position of the screen image is set for the particular display device.

18 Claims, 11 Drawing Sheets

METHOD AND APPARATUS FOR CENTERING AN IMAGE ON A DISPLAY MONITOR

CROSS-REFERENCES TO RELATED APPLICATIONS

The present application is a continuation-in-part of the following U.S. patent application:

U.S. patent application entitled, "Web Browser Allowing Navigation Between Hypertext Objects Using Remote Control," having application Ser. No. 08/660,088, and filed on Jun. 3, 1996 pending; which is assigned to the assignee of the present invention.

FIELD OF THE INVENTION

The present invention relates generally to the field of user interfaces for web browsers, and more particularly to a method of centering an image displayed on a display device.

BACKGROUND OF THE INVENTION

The Internet is rapidly becoming an important source of information and electronic communication for users of personal computers in homes and businesses. Much of the information on the Internet is available on a network called the World-Wide Web. The World-Wide Web is a collection of formatted hypertext pages located on numerous computers around the world that are logically connected by the Internet. Information from the World-Wide Web is displayed in the form of "web pages" which are accessed by user interface programs called "web browsers". Much of the information from the World-Wide Web is graphical in nature, and a typical web page can include text, graphic images, and animation sequences. Because of this graphic content, the proper display of such images on a monitor is fundamental to the utility of web pages. Until recently, access to the Internet and World-Wide Web from the home environment has been limited to users of networked computers. Recent advances in network technology, however, have enabled access to the Internet and the World-Wide Web through a standard television set as an alternative to the personal computer.

Because traditional web browsers are designed to display web pages on computer systems, their display capabilities are optimized for the display characteristics of standard computer monitors. Certain display characteristics of computer monitors however, differ from the characteristics of other types of display monitors. One such characteristic is the position and size of the active area on the display. Most computer monitors provide controls that allow the user to center the active area on the display screen. Some may even provide controls that allow the user to stretch the image horizontally or vertically to fill the screen and minimize the overscan area.

Overscan refers to the edges (or border) of the CRT (Cathode Ray Tube) display. On a computer display, a blank or black overscan area serves to frame the active area and helps to indicate that the entire active area is displayed without any cutoff on the sides. Other types of display devices, such as televisions, however may provide very little user control over how much the active area extends into the overscan area. For example, most televisions are designed so that the picture fills the entire width and height of the screen. Because televisions are designed to receive and display broadcast signals which take into account the possible loss of content at the borders, the overscan does not pose a significant problem, and consequently very little content is usually lost at the edges of the picture. However, the display of graphic intensive web pages which contain content from one edge of the active area to the other may suffer if the image is not properly positioned in the center of the screen. Unfortunately many televisions do not offer controls which allow a user to center the image on the screen. In this case, it is possible that a web page displayed on such a television may lose some of its content because of cut-off from the sides.

One problem associated with prior art web browsers is that users are not provided a means of centering the image if the image appears off-center or is cut-off at an edge. This problem is not as acute when the display device is a computer monitor, since the use of well-established industry standards allows the production of video signals that are optimized for these monitors, and the monitors themselves typically contain adjustment mechanisms which allow the user to center the image. However, as televisions and other monitors are employed to display web pages, user control over display position from the web browser or computer application itself becomes increasingly important. It is therefore desirable to provide a web browser system which facilitates the centering of an image display within a display monitor. It is further desirable to provide a web browser system which stores a user specified display position once the user has positioned the image.

SUMMARY OF THE INVENTION

The present invention discloses a method and apparatus for centering a screen image displayed on a display device in a client system in communication with one or more server systems.

According to one aspect of the present invention, a center adjustment screen is displayed on the display device. The center adjustment screen prompts the user to shift the location of the screen image using direction control buttons provided in the center adjustment screen. The position information generated by the control inputs entered by the user are stored in offset registers. The position information is also stored in non-volatile memory so that the offset registers can be automatically reloaded with the user-selected offset values every time the web browser is used.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals indicate similar elements and in which.

DETAILED DESCRIPTION

A method and apparatus for centering a display image on a display device using a web browser are described. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

As will be described in greater detail below, the present invention includes steps for implementing a web browser that allows a user to alter the position of screen images obtained from the World-Wide Web (hereinafter "web") or built-in to the web browser or service, and displayed on a display device. The user is not required to identify or locate controls on the display device; rather, the system of the present invention provides these functions on the screen itself.

In one embodiment, the steps of the present invention are embodied in machine-executable instructions. The instructions can be used to cause a general-purpose or special-purpose processor which is programmed with the instructions to perform the steps of the present invention. Alternatively, the steps of the present invention might be performed by specific hardware components that contain hardwired logic for performing the steps, or by any combination of programmed computer components and custom hardware components.

The present invention is included in a system known as WebTV™, which uses a standard television set as a display device for browsing the web and which connects to a conventional network, such as the Internet, using standard telephone, Integrated Services Digital Network (ISDN), or similar communication lines (WebTV™ is a trademark of WebTV Networks, Inc. of Palo Alto, Calif.). In accordance with the present invention, a user of a WebTV™ client system can utilize WebTV™ network services provided by one or more remote WebTV™ servers. The WebTV™ network services can be used in conjunction with software running in a WebTV™ client system to browse the web, send electronic mail, and to make use of the Internet in various other ways.

Figure 1A:
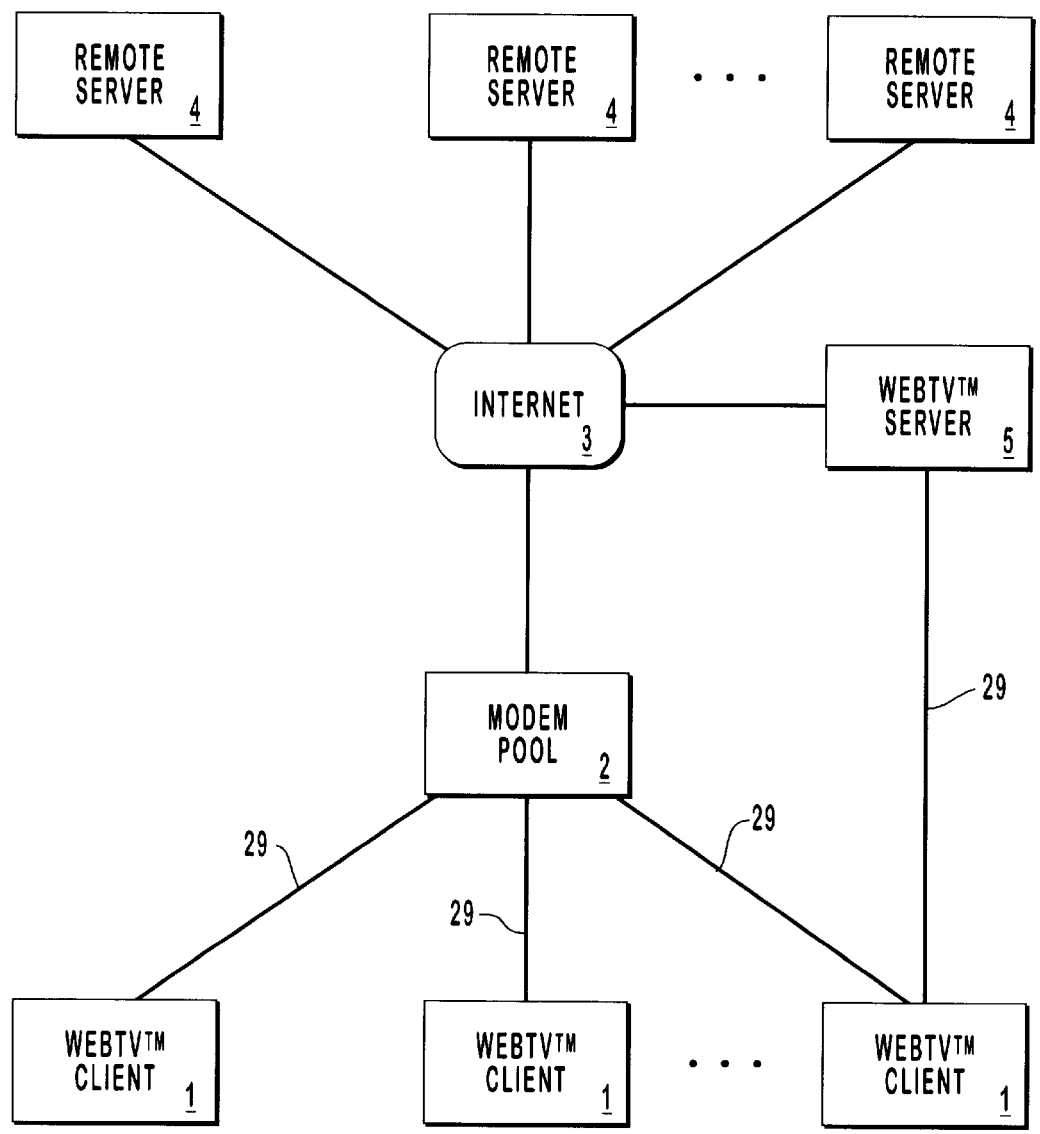
FIG. 1A illustrates several WebTV™ client systems connected to a WebTV™ server system.

FIG. 1A illustrates a basic configuration of the WebTV™ network according to one embodiment. A number of WebTV™ clients 1 are coupled to a modem pool 2 via direct-dial, bi-directional data connections 29, which may be telephone, ISDN, or any other similar type of connection. The modem pool 2 is coupled typically through a router, such as that conventionally known in the art, to a number of remote servers 4 via a conventional network infrastructure 3, such as the Internet. The WebTV™ system also includes a WebTV™ server 5, which specifically supports the WebTV™ clients 1. The WebTV™ clients 1 each have a connection to the WebTV™ server 5 either directly or through the modem pool 2 and the Internet 3. Note that the modem pool 2 is a conventional modem pool, such as those found today throughout the world providing access to the Internet and private networks.

Client System Architecture

Figure 1B:
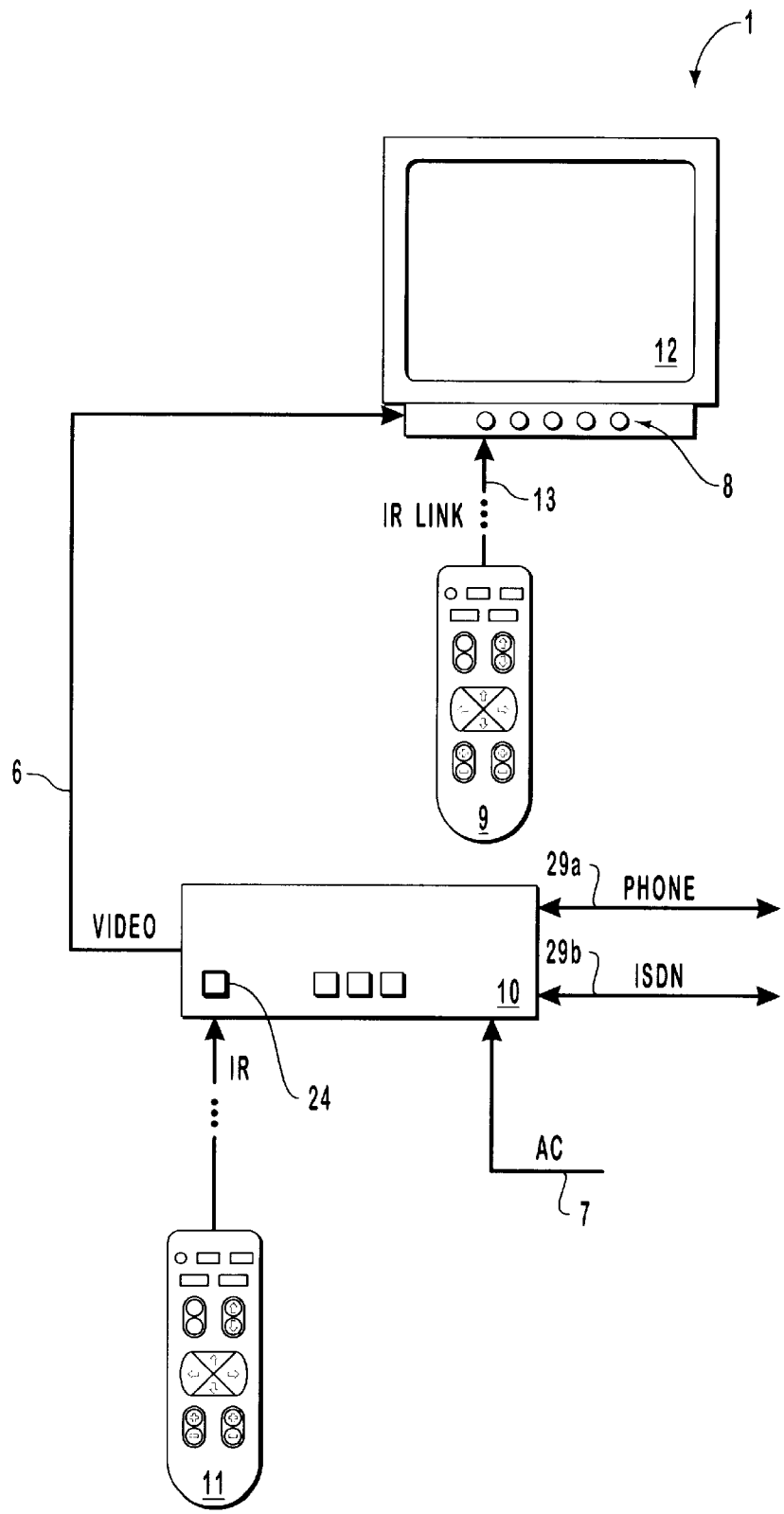
FIG. 1B illustrates a WebTV™ client system.

FIG. 1B illustrates a WebTV™ client 1. The WebTV™ client 1 includes an electronics unit 10 (hereinafter referred to as "the WebTV™ box 10"), an ordinary television set 12, and a remote control 11. In an alternative embodiment of the present invention, the WebTV™ box 10 is built into the television set 12 as an integral unit. The WebTV™ box 10 includes hardware and software for providing the user with a graphical user interface, by which the user can access the WebTV™ network services, browse the web, send e-mail, and otherwise access the Internet.

The WebTV™ client 1 uses the television set 12 as a display device. Television set 12 contains front panel knobs 8 which provide for user control of several operational parameters such as power, picture quality, and picture source, among others. A remote control unit 9 may also be available to control the operation of television 12. Television 12 receives commands from remote control 9 via an infrared (IR) communication link. In alternative embodiments, the link 13 between the remote control unit 9 and the television 12 may be radio frequency (RF) or any equivalent mode of transmission.

The WebTV™ box 10 is coupled to the television set 12 by a video link 6. The video link 6 is an RF, S-video, composite video, or other equivalent form of video link. The communication link 29 between the WebTV™ box 10 and the server 5 is either a telephone connection 29a or an ISDN connection 29b. The WebTV™ box 10 receives AC (alternating current) power through an AC power line 7.

Remote control 11 is operated by the user in order to control the WebTV™ client 1 in browsing the web, sending e-mail, and performing other Internet related functions. The WebTV™ box 10 receives commands from remote control 11 via an infrared (IR) communication link. In alternative embodiments, the link between the remote control 11 and the WebTV™ box 10 may be RF or any equivalent mode of transmission, and remote control 11 may be configured to control television set 12 through link 13.

The WebTV™ box 10 includes application software which, when executed by a processor in the box 10, provides the user with a graphical user interface by which the user can access the WebTV™ network services and browse the web. The application software is automatically executed upon application of power to the WebTV™ box 10.

Figure 1C:
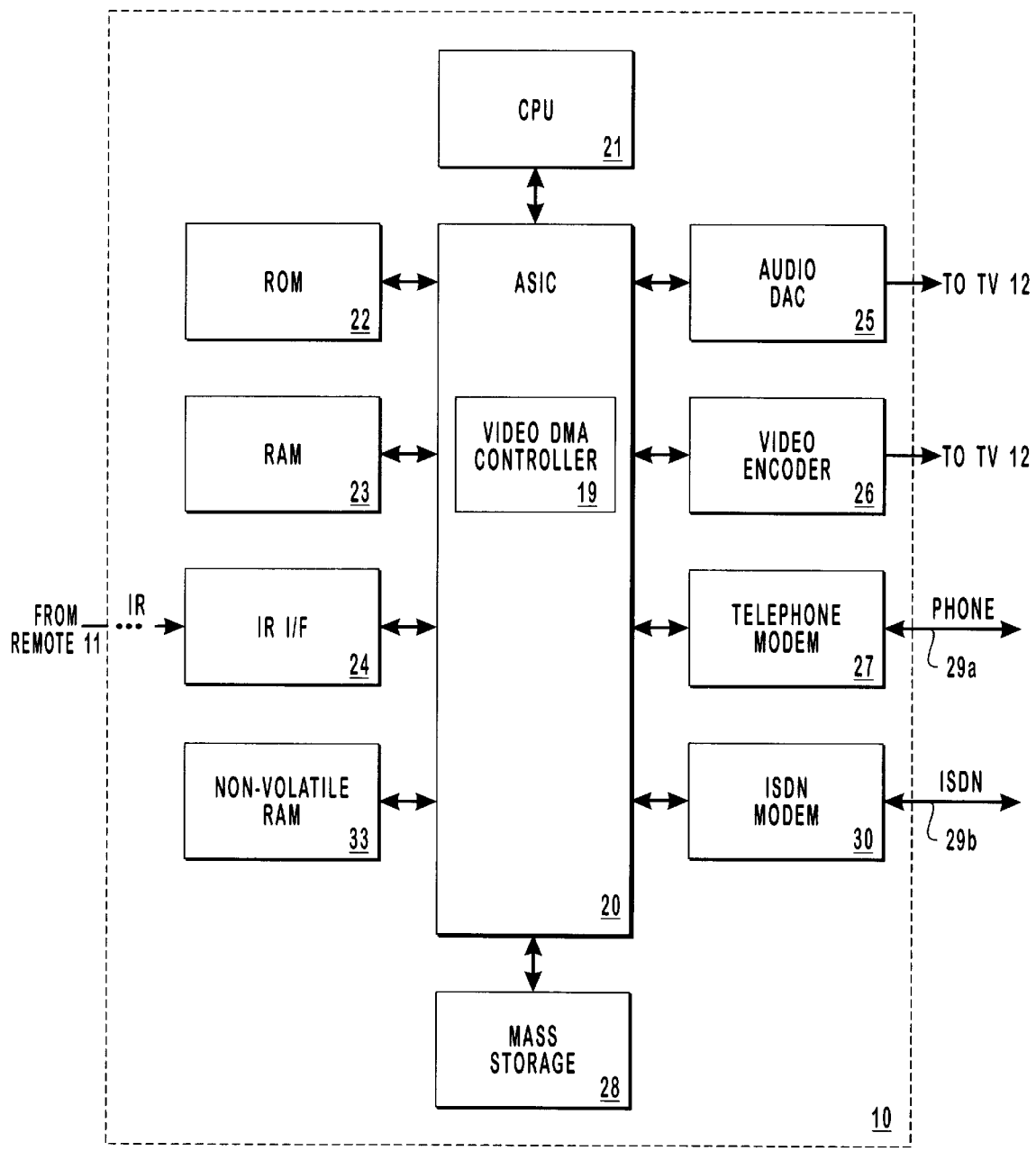
FIG. 1C illustrates a block diagram of an electronics unit used to implement a web browser according to one embodiment of the present invention.

FIG. 1C is a block diagram of the internal features of the WebTV™ box 10. Operation of the WebTV™ client 1 is controlled by a central processing unit (CPU) 21 which is coupled to an Application-Specific Integrated Circuit (ASIC) 20. The CPU 21 executes software designed to implement features of the present invention. ASIC 20 contains circuitry which may be used to implement certain features provided by the WebTV™ client 1. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. A standard telephone modem 27 and an ISDN modem 30 are coupled to ASIC 20 to provide connections 29a and 29b, respectively, to the modem pool 2 and, via the Internet 3, to the remote servers 4. Note that the WebTV™ box 10 also may include a cable television modem (not shown).

Also coupled to ASIC 20 is Read-Only Memory (ROM) 22, which provides storage of program code for implementing the application software to be executed by the WebTV™ box 10. Note that ROM 22 may be a programmable ROM (PROM) or any form of erasable PROM (EPROM) or Flash memory. Also coupled to ASIC 20 is Random Access Memory (RAM) 23. A mass storage device 28 may optionally be provided and coupled to ASIC 20. The mass storage device 28 may be used to input software or data to the client or to download software or data received over network connection 29. The mass storage device 28 includes any suitable medium for storing machine-executable instructions, such as magnetic disks, optical disks, and the like. ASIC 20 contains a video DMA (direct memory access) controller 19 which transfers pixel information comprising the displayable images from memory to video encoder 26 for display on television 12.

Application Software

Figure 2A:
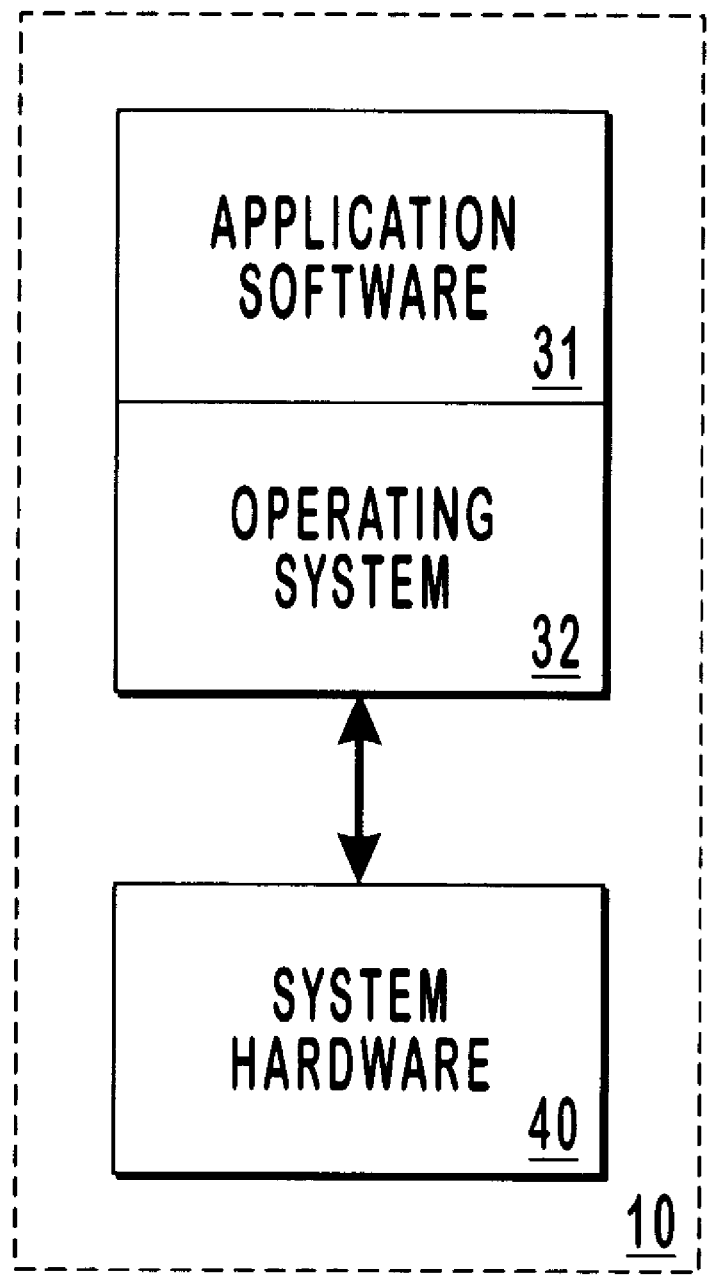
FIG. 2A illustrates a block diagram of the web browser application software according to one embodiment of the present invention.

As mentioned above, the WebTV™ box 10 includes application software including a web browser. Referring now to FIG. 2A, the above-mentioned application software 31 operates in conjunction with operating system (OS) software 32. The OS software 32 includes various device drivers and otherwise provides an interface between the application software 31 and the system hardware components 40 (i.e., the elements illustrated in FIG. 1C).

In the preferred embodiment, the application software 31 and OS software 32 are stored in ROM 22. It will be recognized, however, that either or both of application software 31 and OS software 32 can be stored on any suitable storage medium, including magnetic or optical storage devices.

Figure 2B:
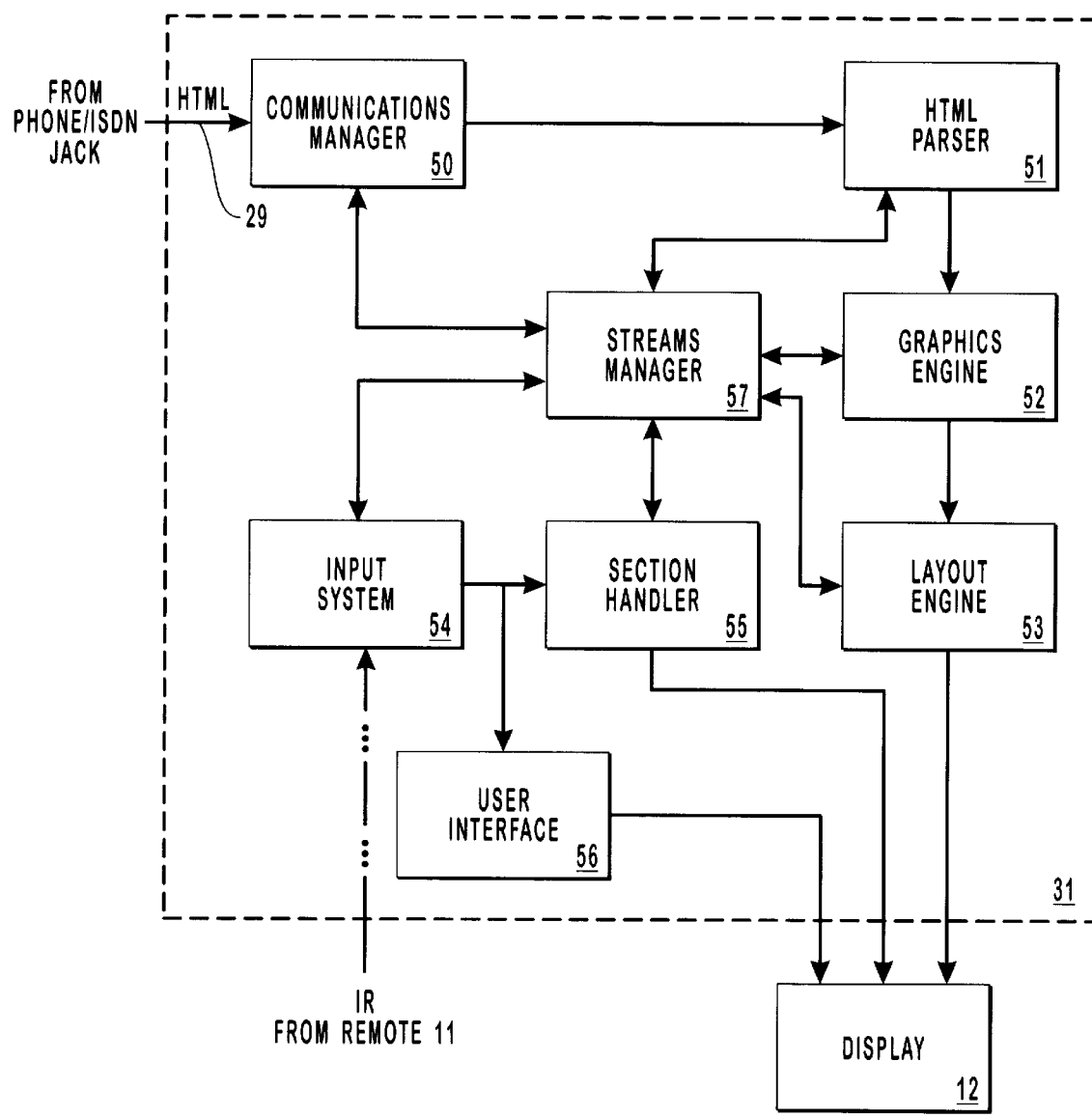
FIG. 2B illustrates the functional relationship between hardware and software in the client processing system of FIG. 1C.

The web browser functions of the present invention are implemented by application software 31. FIG. 2B illustrates the functional relationships between the various components of application software 31. Application software 31 includes a communications manager 50, an HTML (Hypertext Markup Language) parser 51, a graphics engine 52, a layout engine 53, an input system 54, a user interface 56, a selection handler 55, and a streams manager 57. The client system receives web pages over network connection 29 in the form of HTML documents. Streams manager 57 controls and coordinates movement of data throughout the system.

Each HTML document is initially input to communications manager 50. Communications manager 50 performs functions necessary to receive an HTML document over network connection 29, including handling high-level communications protocols, such as HTTP (Hypertext Transport Protocol), TCP/IP (Transmission Control Protocol/Internet Protocol), among others. A received HTML document is provided by communications manager 50 to HTML parser 51. HTML parser 51 converts HTML page descriptions to a displayable format for the display 12 on a client system.

As is well known, an HTML document may contain text and/or refer to images. Further, an HTML document may include one or more "hypertext anchors," which are displayable objects that provide a link to another web page. Hypertext anchors are also sometimes referred to as "hot links" or "hot spots". Each hypertext anchor is associated with a particular URL (Uniform Resource Locator) or other logical address representing the location of the web page to which the anchor provides a link. Image information, such as JPEG or GIF image information, are provided by HTML parser 51 to layout engine 53 via a graphics engine 52, which is responsible for measuring and drawing images.

In the course of browsing through a displayed web page or between different web pages, a user activates buttons on remote control 11, which, in response, transmits IR signals that are received by the WebTV™ box 10. Input system 54 records these inputs and provides them to selection handler 55 and user interface 56. Remote control 11 provides access to cursor control buttons (such as up, down, left, and right) which control the positioning of a cursor or other objects displayed on a web page. Input system 54 can also handle input queuing and processing of inputs from various other input devices, such as a keyboard coupled to WebTV™ box 10 through either a standard hardwire link or an IR link. Other aspects of the web browser which are visible to the user are provided by user interface 56 based on signals received from input system 54.

Setup and Screen Control

Figure 3:
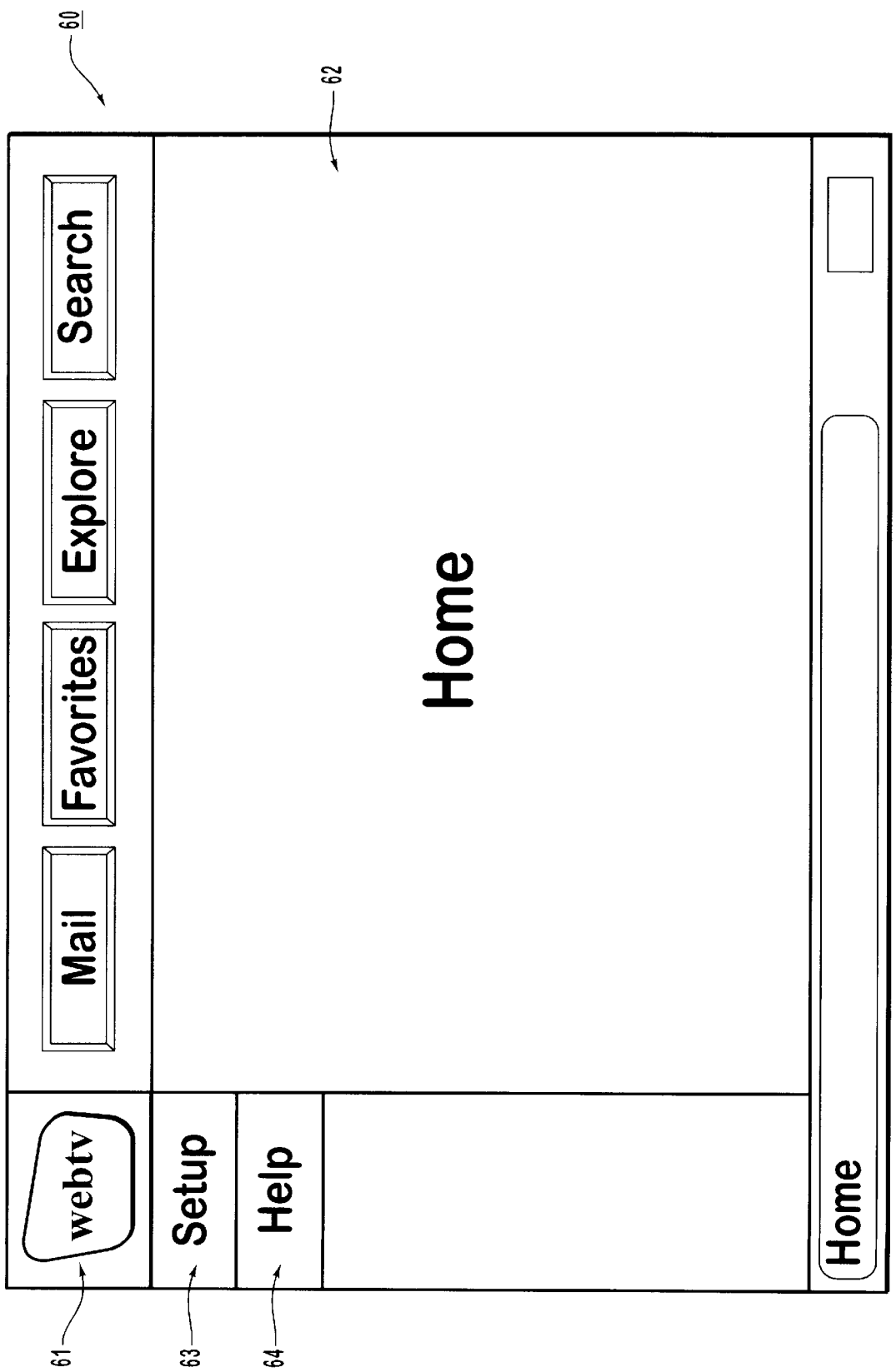
FIG. 3 illustrates the Home Page of the WebTV™ web browser program.

FIG. 3 illustrates the Home page of the WebTV™ network service. The Home page may be accessed and displayed by depressing a home page access button on the remote control 11 or manipulating the cursor control buttons to access appropriate hypertext anchors, or by typing the appropriate URL address for the WebTV™ Home page to input system 54.

The WebTV™ Home page 60 includes the WebTV™ logo 61, a home graphics and text field 62, and hypertext anchors 63 and 64. Hypertext anchor 63 is a link to the Setup page for the WebTV™ system. Hypertext anchor 64 is a link to the Instruction page for the WebTV™ system.

Figure 4A:
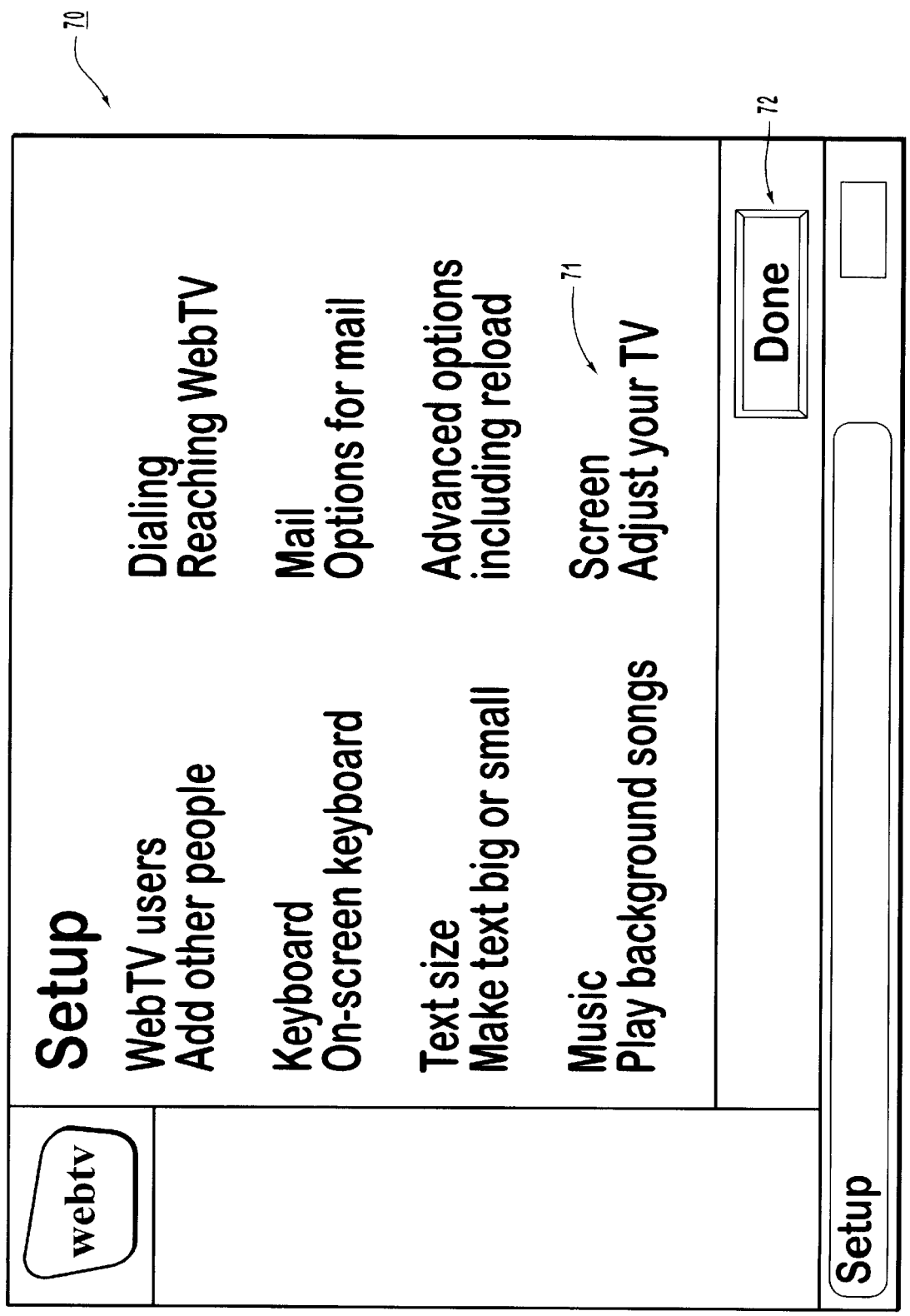
FIG. 4A illustrates the Setup screen of the WebTV™ web browser program.
Figure 4B:
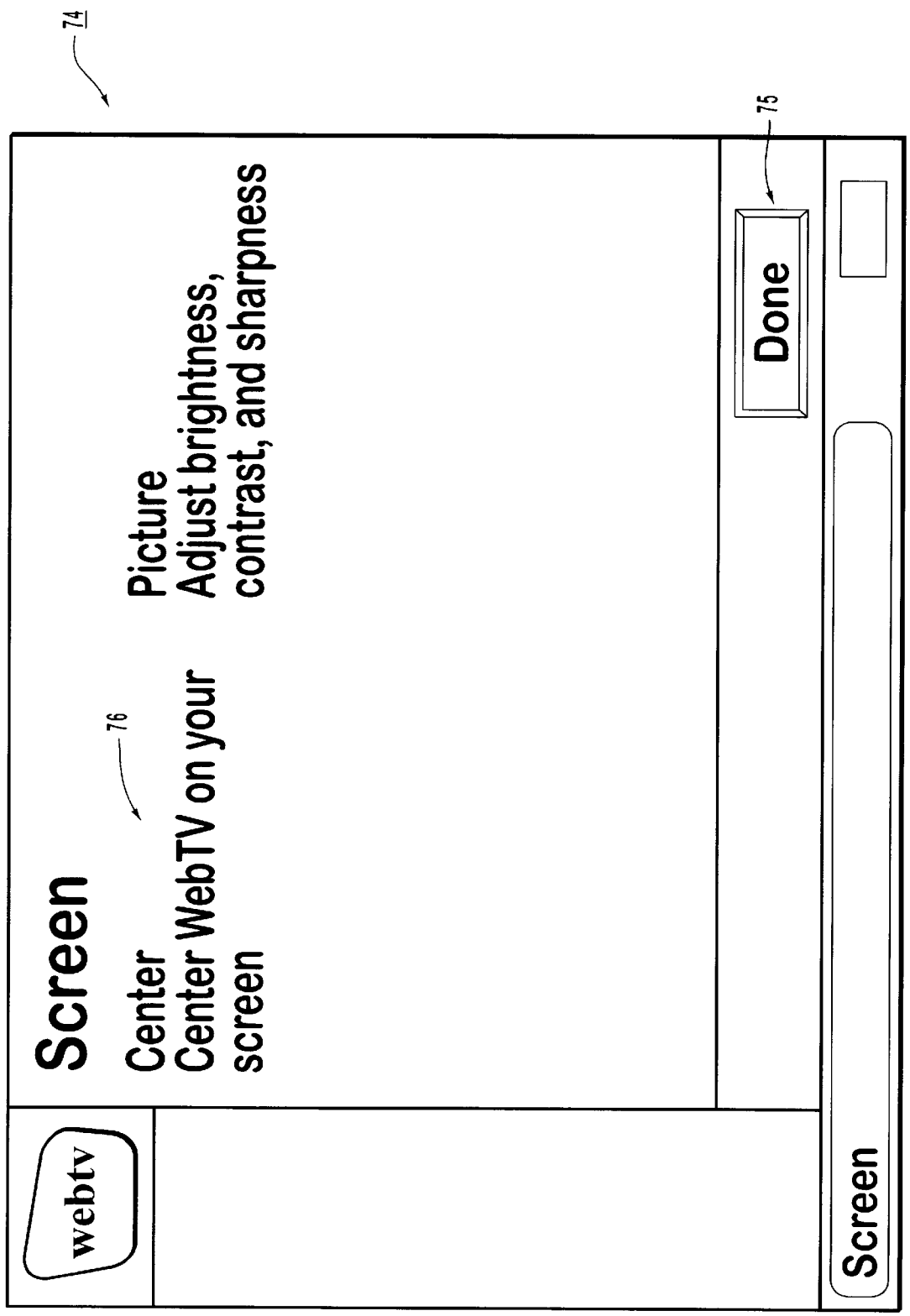
FIG. 4B illustrates the Screen Control screen of the WebTV™ web browser program.

If the user selects the Setup hypertext anchor 63, the WebTV™ Setup screen is displayed. The WebTV™ Setup 70 screen is illustrated in FIG. 4A, and includes hypertext anchors 71 and 72. Hypertext anchor 71 is a link to the Screen Control screen, and hypertext anchor 72 labeled 'Done' is a link back to the Home page 60 of the WebTV™ system. If the user selects the Screen hypertext anchor 71, the Screen Control screen is displayed. The WebTV™ Screen Control screen 74 is illustrated in FIG. 4B, and includes hypertext anchors 75 and 76. Hypertext anchor 76 is a link to the Center Adjustment screen, and hypertext anchor 75 labeled 'Done' is a link back to the Setup page 70 of the WebTV™ system.

Center Adjustment

Figure 4C:
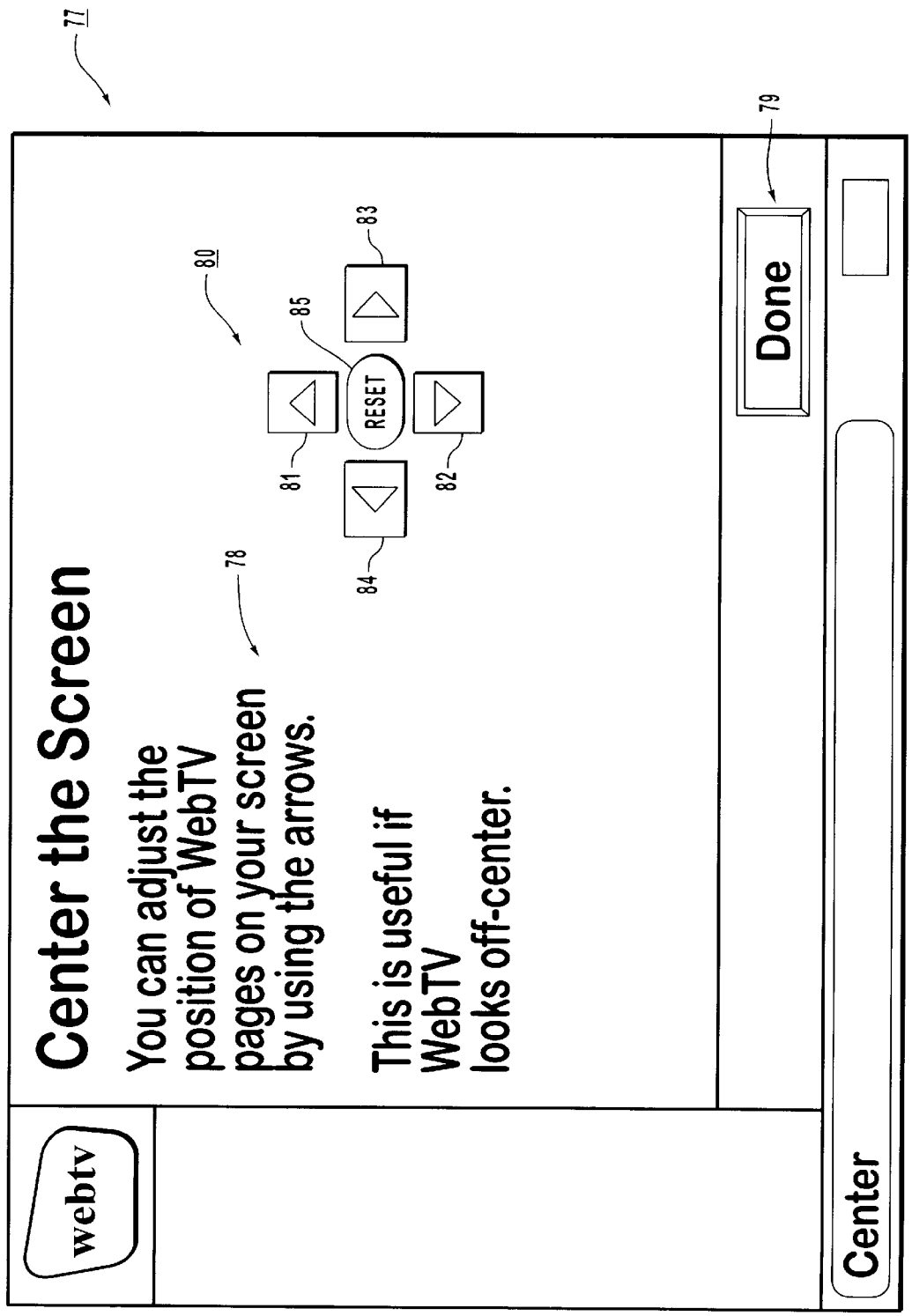
FIG. 4C illustrates the Center Adjustment screen of the WebTV™ web browser program.

In one embodiment of the present invention, if the user selects the Center hypertext anchor 76 in the Screen Control screen 74, a Center Adjustment screen is displayed. FIG. 4C illustrates the Center Adjustment screen 77 which provides instructions and control buttons for moving the position of the screen image on the display monitor. The Center Adjustment screen 77 includes an instruction field 78, a control field 80 containing control buttons, and a 'Done' hypertext anchor 79. The instruction field 78 contains text instructing the user to invoke the control buttons in the control field 80 to center the screen image 77 on the display monitor.

The user selects the appropriate control button in control field 80 to shift the screen in the desired direction. According to one embodiment of the present invention, control field 80 contains four arrow buttons, 81, 82, 83, and 84, and a reset button 85. Selecting the up arrow button 81 causes screen image 77 to move upwards in the display, while selecting the down arrow button 82 causes screen image 77 to move downwards in the display. Likewise, selecting the right arrow button 83 causes screen image 77 to move rightwards in the display, while selecting left arrow button 84 causes screen image 77 to move leftwards in the display. The reset button 85 returns the image to the default screen location.

The user may select and activate the control buttons within control field 80 by using either the remote control unit 11, or any other input device coupled to the WebTV™ control box 10, such as a keyboard or joystick device. In one embodiment of the present invention, the control buttons are selected by placing the cursor on the control button using the cursor control keys on remote control 11, or other user input device. The selected control button within control field 80 are then activated by pressing the appropriate activation key on the user input device (e.g., the 'Enter' key on remote control 11). After the user sets the position of the screen image to the desired position on the display, the 'Done' hypertext anchor 79 may be selected to return to the WebTV™ home page.

In an alternative embodiment of the present invention, direction control buttons on an input device, such as remote control 11 or a keyboard, are used to position the screen image on the display. In this case, the direction control buttons in control field 80 need not be selected; instead, the appropriate direction control buttons on the input device would be pressed to move the screen image in the desired direction. Depending upon the particular input device used, such direction control buttons could be arrow keys or the like, or specific key sequences which are programmed to move a cursor or other displayed objects on the screen.

Figure 5A:
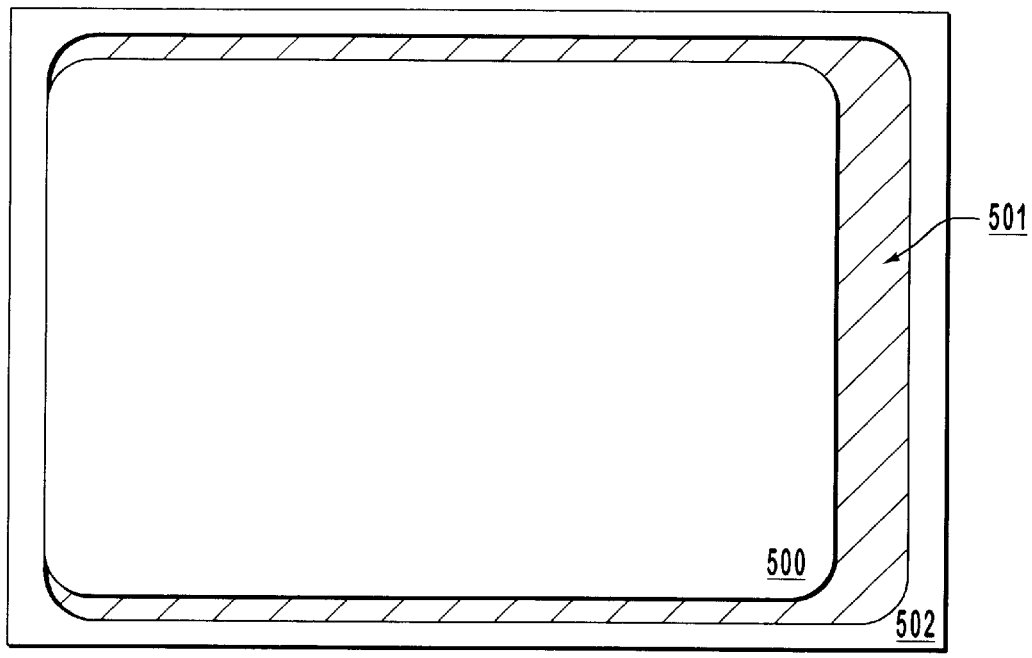
FIG. 5A illustrates an off-center active area within a display screen.

The screen image displayed on the monitor may need to be centered or repositioned if the active area of the image is cutoff by one or more sides of the display. Such a cutoff could occur with display monitors which have little or no overscan area to frame the active area of a screen image. FIG. 5A illustrates the active area of a screen display 500 and an overscan area 501 on a display monitor 502. On most display monitors, overscan area 501 appears as a thin black border surrounding active area 500. If display monitor 502 is designed or manufactured such that the active area is not centered, that off-center shift could result in the cutoff of the active area of a screen display. Furthermore, display monitors not properly calibrated to display images transmitted over a computer network may display such images in an incorrect position within the display area. FIG. 5A illustrates active area 500 as shifted to the left and slightly upwards in relation to overscan area 501. In the case illustrated in FIG. 5A, the horizontal off-center shift is so pronounced that the left side of active area 500 is cutoff by the left side of display monitor 502. If the active area 500 contained full content from one border to the other, some content (i.e., content on left side of the active area) could be lost. If the display monitor does not provide controls which allow the user to position the image displayed on the monitor, such a shift would compromise the utility of the display monitor.

Figure 5B:
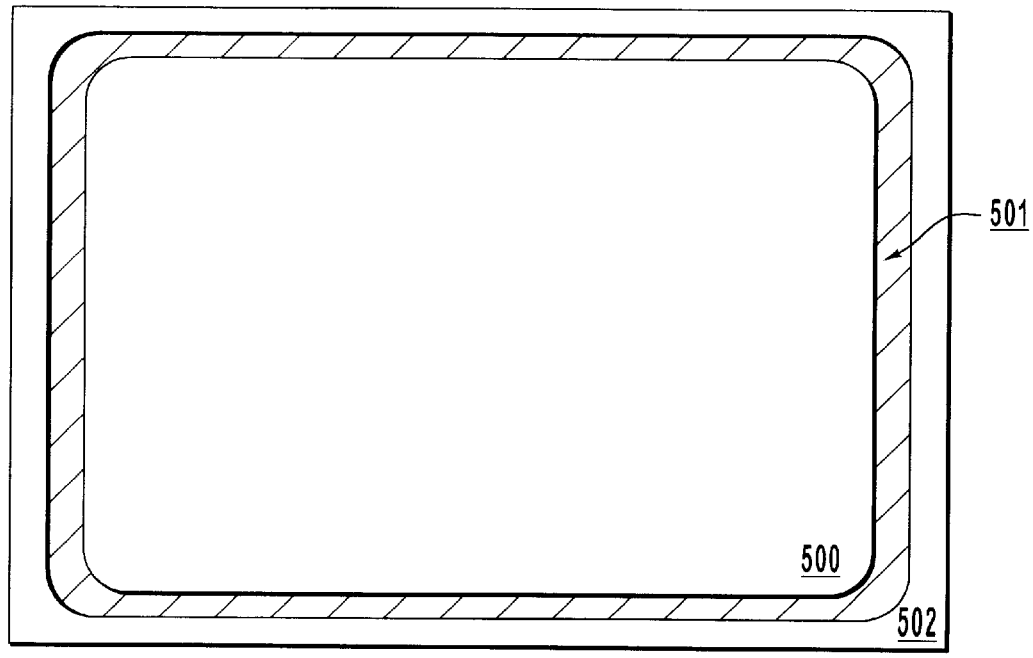
FIG. 5B illustrates a centered active area within a display screen.

Because the present invention provides user control over the position of a display image on any display monitor, the off-center problem illustrated in FIG. 5A can be remedied. Using control buttons 80 on Center Adjustment screen 77, the user may center screen image 500 so that the entire active area is visible on display 502. For example, to center the active area 500 displayed in FIG. 5A, the right control button 83 and down control button 82 would be selected to bring active area 500 down and to the right so that it would be centered with respect to the overscan area 501, as illustrated in FIG. 5B.

The screen centering controls also allow a user to correctly position the active area 500 of a screen image if the display monitor 502 is not correctly calibrated to receive and display the full active area of a screen image. In this case, the direction control buttons 80 could be used to 'scroll' the active area 500 within the borders of the display monitor.

Screen Centering Operation

According to one embodiment of the present invention, registers within a DMA device are programmed with the position information associated with the active area of a screen image to be displayed on a display device. In the WebTV™ client box 10, video DMA controller 19 within ASIC 20 contains two registers, a horizontal start register and a vertical start register. The horizontal start register stores the horizontal coordinate value of a reference point associated with the active area, and the vertical start register stores the vertical coordinate value of the reference point associated with the active area. These position coordinates are also stored in non-volatile memory within the WebTV™ client box 10, and written to the DMA registers upon subsequent start-up of the WebTV™ web browser.

Figure 6:
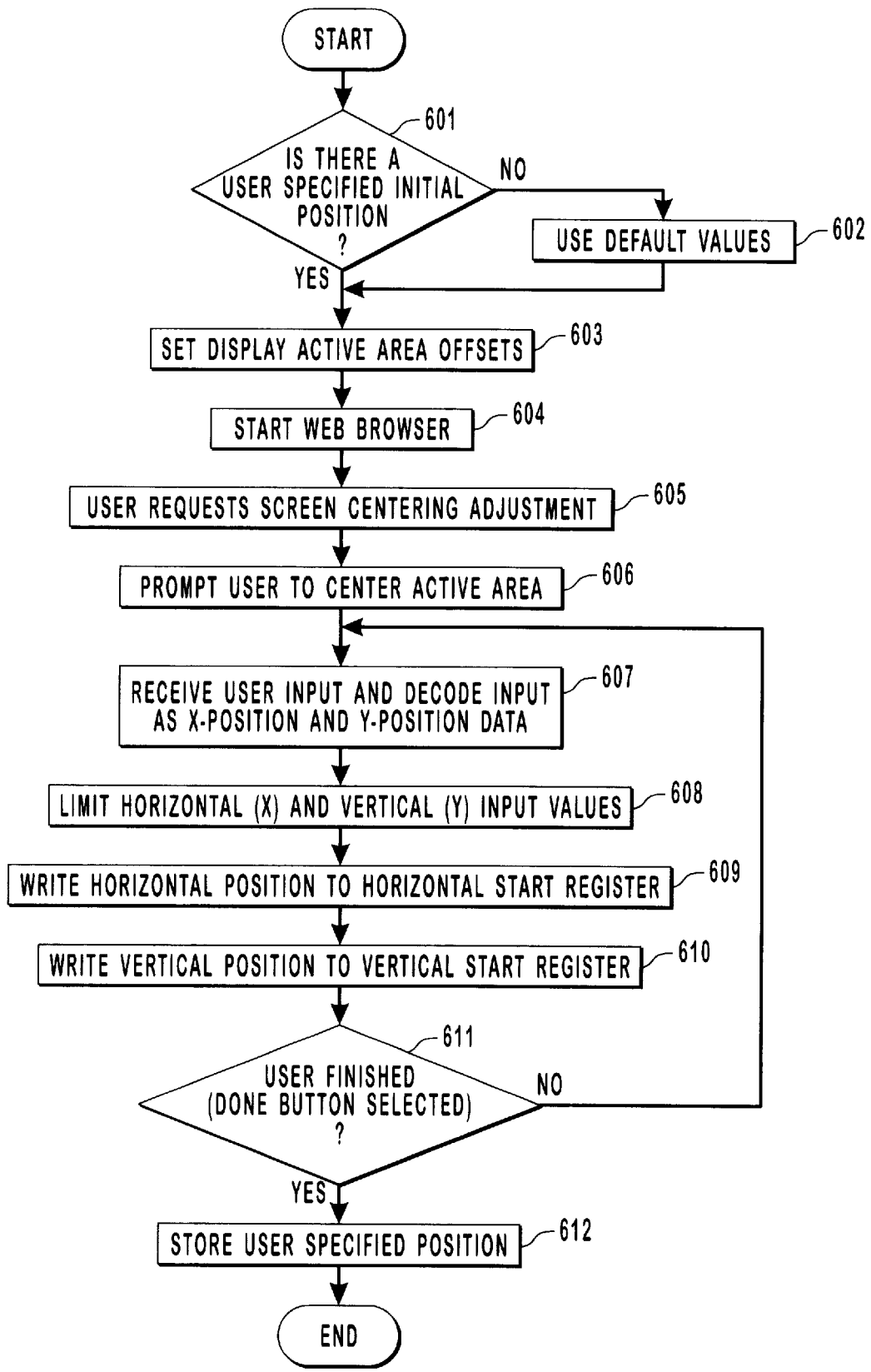
FIG. 6 is a flow chart illustrating the process of updating and storing screen image location information according to one embodiment of the present invention.

FIG. 6 illustrates the process of centering the active area of a screen image according to one embodiment of the present invention. The WebTV™ client begins by determining the initial position of the active area of the screen image. A user specified initial position may be stored in specific memory locations in a memory in the WebTV™ client. In one embodiment of the present invention, the horizontal and vertical values corresponding to a user specified initial position are stored in non-volatile memory 33 in WebTV™ box 10. In step 601, the WebTV™ client determines whether there is a user specified initial position for the active area by checking the values programmed in these memory locations. If no initial values are programmed in non-volatile memory 33 as determined in step 601, default values programmed into ROM 22 within the WebTV™ box 10 are used, step 602. A message stating that no initial display position was present may then be displayed on monitor 12. If initial position values have been programmed in non-volatile memory 33, these position values are copied from non-volatile memory 33 to the horizontal and vertical start registers in video DMA controller 19.

The user-specified initial values, or the default values (if no user-specified initial values were programmed), are then passed as active area position values to video encoder 26, and the active area of the screen is moved to the area on display 12 corresponding to these position values, step 603. At step 604, the WebTV™ web browser is started. Steps 601–604 comprise the boot-time sequence which is initiated upon the booting of the WebTV™ system.

If the user determines that the screen image is not centered or positioned properly once the WebTV™ web browser is running, he may invoke the screen center adjustment function within the browser, step 605. The user invokes the Center Adjustment screen 77 of the WebTV™ web browser to access controls which allow repositioning of the screen image. Center Adjustment screen 77 prompts the user to manipulate the control buttons 80 to center the screen appropriately, step 606. As described above, the user activates the appropriate control buttons 80 on Center Adjustment screen 77 to shift the location of the active area of the screen image relative to the borders or overscan area of the display device 12. Input to the WebTV™ box 10 through activation of the control buttons are decoded in ASIC 20 as horizontal (x) offset values and vertical (y) offset values, step 607. The horizontal and vertical offset values are limited by maximum and minimum threshold values programmed into display control system, step 608. The limiting values ensure that the active area stays within the boundaries of the display device 12 after re-positioning, and is not shifted to a non-displayable area.

The user action of moving the active area of a screen image using a screen movement control causes the reprogramming of the horizontal and/or vertical start registers in the video DMA controller 19. If the movement of the active area has a horizontal component, the horizontal offset value corresponding to the amount of horizontal movement is programmed into the horizontal start register, step 609. If the horizontal offset exceeds the maximum threshold, no reprogramming of the horizontal start register of values above this maximum limit occurs. Similarly, if the movement of the active area has a vertical component, the vertical offset value corresponding to the amount of vertical movement is programmed into the vertical start register, step 610. If the vertical offset exceeds the maximum threshold value, no reprogramming of the vertical start register of values above this maximum limit occurs.

Once the active area has been properly centered or positioned, the user selects the 'Done' hypertext anchor 79 on the Center Adjustment screen 77 of the WebTV™ web browser, step 611. If the user has not yet completed the centering operation, the process continues from step 607 with the WebTV™ client receiving user input through control buttons 80 on Center Adjustment screen 77. When the user selects the 'Done' hypertext anchor 79, the x and y offset values programmed in the horizontal and vertical start registers are written to memory, step 612. As noted above, in one embodiment of the present invention, the x and y offset values are stored in address locations in non-volatile memory 33 in WebTV™ box 10. Upon reset or subsequent start-up of the WebTV™ system, the previously stored values determine the initial position of the active area for step 601. Thus, the active area of the screen need only be centered once for a particular display device 12, and the WebTV™ browser stores the active area position information for that device.

As should be apparent to those of ordinary skill in the art, although the screen position offset values are disclosed as being stored in addressable locations in non-volatile memory, several other storage means and media are possible. For example, the position offset information could be provided by any number of reference location points and stored in any number of registers or memory locations on RAM, disk, streaming tape, or like media.

Control Screen Authoring

In one embodiment of the present invention, the WebTV™ Home Page and Setup Page are created using standard HTML command structures well known to those skilled in the art. Similarly, each of the Picture Adjustment and Center Adjustment screens are also produced by constructing HTML objects and program links. Various different page formats and sequences may be utilized to achieve the present invention.

According to another embodiment, the screen setup pages, including the Center Adjustment screen 77 could be produced using bit-mapped images or standard graphic format images, and displayed on a display device through a network interface, or over a broadcast signal. In such embodiments these screens need not be web pages accessed from the World-Wide Web using a web browser, but instead could be images of the type normally created, transmitted and displayed within the system in which the display device is typically used, such as a Local Area Network for a computer display, or a broadcast system for a television. In yet another embodiment, the screen setup pages could programmed into the display device as a built-in feature and accessed through a dedicated control button or on-screen menu.

Each of the control buttons 80 in the Center Adjustment screen 77, as well as the control and link buttons in the other setup pages, are graphics objects embedded within their pages through standard HTML object or function calls.

Thus, a method and apparatus have been described for allowing a user to center the image of a web page displayed on a display device using a web browser program. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a computer network that includes (i) a plurality of servers for accessing a plurality of network sites containing various types of content, as for example text and graphics files, which can be viewed and downloaded when desired, and that includes (ii) a plurality of client systems, at least some of which are comprised of a television monitor electronically connected to and controlled by a processor and an input device which together permit the television monitor to function as a computer display while the processor of the client system is connected to a server for purposes of browsing the network sites, a method of centering a page of a network site on the television monitor when it is used as a computer display while browsing such network sites, comprising the steps of:

establishing a connection between a processor of a client system and one of said servers so that the television monitor of the client system is thereafter utilized as a computer display for purposes of browsing one or more pages of one or more network sites;

providing access at said server to which the client system is connected to a center adjustment screen page which includes instructions for adjusting the active area of the television monitor's display to an optimally desired position which will permit optimal display of the various pages browsed at each network site that is accessed by the client system;

accessing the adjustment screen page using the input device and processor of the client system that is connected to said server, and thereater inputting instructions from the input device and processor of the client system to optimally adjust the active area of the television monitor's display; and thereafter leaving the adjustment screen page and using the client system to browse other pages of one or more other network sites.

2. A method according to claim 1, further comprising the step of displaying a position control field on said center adjustment screen page, wherein said position control field includes one or more direction controls that are accessed by the input device and processor of the client system.

3. A method according to claim 2, further comprising the step of displaying instructions on said center adjustment screen page, said instructions instructing the selection of said one or more displayed direction controls.

4. A method according to claim 2, wherein said position control field comprises a horizontal location value of a reference point on an active area of said television monitor used as a computer display, and a vertical location value of said reference point on said active area.

5. A method according to claim 4, further comprising the steps of:

storing said horizontal location value in a first memory location; and storing said vertical location value in a second memory location.

6. A method according to claim 5, wherein said input device is coupled to said television monitor through a wireless link, and said step of accessing said center adjustment page further comprises the step of utilizing said wireless link to achieve an interactive adjustment of said active area.

7. A system for centering a page of a network site on a television monitor when it is used as a computer display while browsing such network sites, comprising:

a network server for accessing a plurality of network sites containing various types of content, as for example text and graphics files, which can be viewed and downloaded when desired, said network server comprising means for accessing and displaying a center adjustment screen page which includes instructions for adjusting the active area of a television monitor's display to an optimally desired position which will permit optimal display of the various pages browsed at each network site that is accessed; and a client system comprised of a processor, a television monitor electronically connected to and controlled by the processor and an input device which together permit the television monitor to function as a computer display while the processor of the client system is connected to a server for purposes of browsing the network sites, and said client system further comprising means for accessing and downloading to the television monitor the center adjustment screen page from said server, and means for thereafter utilizing the adjustment screen page together with the input device to optimally adjust an active area of the television monitor for display of the content of one or more pages of one or more network sites as they are browsed using the client system and server.

8. A system according to claim 7, wherein said center adjustment screen page comprises position data having a horizontal location coordinate of a reference point on said center adjustment screen and a vertical location coordinate of said reference point on said center adjustment screen.

9. A system according to claim 8 further comprising a memory means having a first location storing said horizontal location coordinate and a second location storing said vertical location coordinate.

10. A system according to claim 9 wherein said memory means is a non-volatile memory device.

11. A system according to claim 9 wherein said center adjustment screen page comprises a screen image displayed through an interactive display environment including World-Wide Web content.

12. A system according to claim 11, wherein said center adjustment screen page includes a Hypertext Mark-up Language (HTML) object.

13. In a computer network that includes (i) a plurality of servers for accessing a plurality of network sites containing various types of content, as for example text and graphics files, which can be viewed and downloaded when desired, and that includes (ii) a plurality of client systems, at least some of which are comprised of a television monitor electronically connected to and controlled by a processor and an input device which together permit the television monitor to function as a computer display while the processor of the client system is connected to a server for purposes of browsing the network sites, as an article of manufacture, a computer program product for implementing on one of said servers a method of centering a page of a network site on the television monitor when it is used as a computer display while browsing such network sites, comprising:

a computer readable medium for carrying computer program code means for implementing said method on one of said servers; and wherein said computer program code means is comprised of:

first program code means for responding to a client system by establishing a connection between a processor of the client system and said one server so that the television monitor of the client system is thereafter utilized as a computer display for purposes of browsing one or more pages of one or more network sites;

second program code means for providing access at said server to which the client system is connected to a center adjustment screen page which includes instructions for adjusting the active of the television monitor's display to an optimally desired position which will permit optimal display of the various pages browsed at each network site that is accessed by the client system;

and downloading in response to an access request from the client system the adjustment screen page so that thereafter the input device and processor of the client system that is connected to said server can be used to optimally adjust the active area of the television monitor's display.

14. A computer program product according to claim 13, further comprising program code means for displaying a position control field on said center adjustment screen page, wherein said position control field includes one or more direction controls that are accessed by the input device and processor of the client system.

15. A computer program product according to claim 14, further comprising program code means for displaying instructions on said center adjustment screen page, said instructions instructing the selection of said one or more displayed direction controls.

16. A computer program product according to claim 14, wherein said position control field comprises a horizontal location value of a reference point on an active area of said television monitor used as a computer display, and a vertical location value of said reference point on said active area.

17. A computer program product according to claim 16, further comprising program code means for performing the steps of;

storing said horizontal location value in a first memory location; and storing said vertical location value in a second memory location.

18. A computer program product according to claim 17, wherein said input device is coupled to said television monitor through a wireless link, and said second program code means for providing access to said center adjustment page further comprises program code means for utilizing said wireless link to achieve an interactive adjustment of said active area.

* * * * *

UNITED STATES PATENT AND TRADEMARK OFFICE
CERTIFICATE OF CORRECTION

PATENT NO.   : 5,945,991
DATED        : August 31, 1999
INVENTOR(S): Joe F. Britt, Bruce A. Leak It is certified that error appears in the above-identified patent and that said Letters Patent is hereby corrected as shown below:

Col. 2, ln. 16: after "standards" change "allows" to --allow--

Col. 7, ln. 16: after "control" change "button" to --buttons--

Col. 7, ln. 55: before "left side" insert --the--

Col. 10, ln. 7: after "could" insert --be--

Col. 12, 27: after "active" and before "of the" insert --area--

Signed and Sealed this

Seventeenth Day of October, 2000

Q. TODD DICKINSON

*Attest:*

*Attesting Officer*   Director of Patents and Trademarks